United States Patent
Myers

(10) Patent No.: US 10,389,536 B2
(45) Date of Patent: *Aug. 20, 2019

(54) IMAGING SYSTEMS WITH DATA ENCRYPTION AND EMBEDDING CAPABALITIES

(71) Applicant: SEMICONDUCTOR COMPONENTS INDUSTRIES, LLC, Phoenix, AZ (US)

(72) Inventor: Charles G. Myers, Hillsboro, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,982

(22) Filed: Dec. 7, 2017

(65) Prior Publication Data

US 2018/0097636 A1 Apr. 5, 2018

Related U.S. Application Data

(63) Continuation of application No. 14/667,406, filed on Mar. 24, 2015, now Pat. No. 9,871,658.

(51) Int. Cl.
*H04L 9/32* (2006.01)
*H04N 1/00* (2006.01)
(Continued)

(52) U.S. Cl.
CPC ............ *H04L 9/3247* (2013.01); *H04N 1/00* (2013.01); *H04N 1/32272* (2013.01); *H04N 1/4486* (2013.01)

(58) Field of Classification Search
CPC .... H04L 9/3247; H04N 1/00; H04N 1/32272; H04N 1/4486
See application file for complete search history.

(56) References Cited

U.S. PATENT DOCUMENTS

| 5,499,294 A | 3/1996 | Friedman |
| 5,841,126 A | 11/1998 | Fossum et al. |

(Continued)

FOREIGN PATENT DOCUMENTS

| CN | 102142131 | | 8/2011 | |
| CN | 102065287 B | * | 9/2012 | ............... G06T 1/00 |
| CN | 103020496 | | 4/2013 | |

OTHER PUBLICATIONS

E.R. Fossunn 'CMOS image sensors: electronic camera-on-a-chip' 1997, IEEE Transactions on Electron Devices, vol. 44, No. 10, pp. 1689-1698 (Year: 1997).*

(Continued)

*Primary Examiner* — Catherine Thiaw
(74) *Attorney, Agent, or Firm* — Treyz Law Group, P.C.; Joseph F. Guihan

(57) ABSTRACT

An imaging system may embed encrypted data into image data. The imaging system may generate image data in response to light received at a pixel array. The imaging system may include encryption circuitry that accesses an encryption key. The encryption circuitry may receive data related to the imaging system and/or to an environment in which an image is captured and encrypt the data using the encryption key. The imaging system may include data embedding circuitry that embeds the encrypted data into the image data to generate an output image. The components of the imaging system may be formed on a single imaging system chip. The encrypted data embedded in the output image may be extracted using an extraction engine and decrypted using a decryption engine and decryption key such that the data may be accessed by a user with access to the decryption key.

20 Claims, 5 Drawing Sheets

(51) Int. Cl.
*H04N 1/32* (2006.01)
*H04N 1/44* (2006.01)

(56) References Cited

U.S. PATENT DOCUMENTS

| | | | |
|---|---|---|---|
| 5,977,997 A | 11/1999 | Vainsencher | |
| 6,005,936 A | 12/1999 | Shimizu et al. | |
| 6,011,860 A | 1/2000 | Fujieda et al. | |
| 6,094,483 A | 7/2000 | Fridrich et al. | |
| 6,400,824 B1 | 6/2002 | Mansoorian et al. | |
| 6,839,844 B1 | 1/2005 | Okano | |
| 6,912,658 B1 | 6/2005 | Glogau et al. | |
| 7,062,069 B2 | 6/2006 | Rhoads | |
| 7,216,232 B1 | 5/2007 | Cox et al. | |
| 8,127,137 B2 | 2/2012 | Levy | |
| 8,588,414 B2 | 11/2013 | Ishii et al. | |
| 8,902,340 B2 | 12/2014 | Silverbrook | |
| 9,418,246 B2 | 8/2016 | Circello et al. | |
| 2004/0013268 A1 | 1/2004 | de Queiroz | |
| 2005/0107944 A1* | 5/2005 | Hovestadt | G01C 21/3484 |
| | | | 701/423 |
| 2005/0169499 A1 | 8/2005 | Rodriguez et al. | |
| 2005/0271246 A1 | 12/2005 | Sharma | |
| 2006/0233149 A1 | 10/2006 | Rustagi et al. | |
| 2006/0238714 A1 | 10/2006 | Fox et al. | |
| 2006/0242418 A1 | 10/2006 | Willamowski et al. | |
| 2007/0074035 A1 | 3/2007 | Scanlon et al. | |
| 2008/0120676 A1 | 5/2008 | Morad et al. | |
| 2008/0313084 A1 | 12/2008 | Socolofsky | |
| 2009/0141932 A1 | 6/2009 | Jones et al. | |
| 2010/0046748 A1 | 2/2010 | Kusnoto et al. | |
| 2012/0163652 A1 | 6/2012 | Xu | |
| 2014/0146966 A1 | 5/2014 | Bieber | |
| 2015/0089589 A1 | 3/2015 | Cucinotta et al. | |
| 2015/0106628 A1 | 4/2015 | Holman et al. | |
| 2015/0178654 A1* | 6/2015 | Glasgow | G06Q 10/06315 |
| | | | 705/7.25 |

OTHER PUBLICATIONS

Bryan Ackland and Alex Dickinson "Camera on Chip", International Solid State Circuits Conferences, IEEE, 1996, pp. 22-26.

S. Turner and L. Chen "Updated Security considerations for MD5 Message-Digest and the HMAC-MD5 algorithms", RFC 6151, 2011, IETF, 8 pages.

B. Wilburn et al. High performance Imaging using large camera arrays, 2005, ACM, pp. 765-766.

\* cited by examiner

ND EMBEDDING
IMAGING SYSTEMS WITH DATA ENCRYPTION AND EMBEDDING CAPABILITIES

This application is a continuation of U.S. patent application Ser. No. 14/667,406, filed Mar. 24, 2015, which is hereby incorporated by reference herein in its entirety. This application claims the benefit of and claims priority to U.S. patent application Ser. No. 14/667,406, filed Mar. 24, 2015.

BACKGROUND

This relates generally to imaging systems, and more particularly, to imaging systems with data encryption capabilities.

Modern electronic devices such as cellular telephones, cameras, and computers often use digital image sensors. Imagers (i.e., image sensors) often include a two-dimensional array of image sensing pixels. Each pixel typically includes a photosensor such as a photodiode that receives incident photons (light) and converts the photons into electrical signals. These electrical signals are converted into image data (i.e., digital image data) that is be used to generate an image.

It is sometimes desirable to include additional data in an image generated by an image sensor. For example, images can include data related to the image sensor that captured the image (i.e., manufacturer information, serial number, sensor specifications or statistics, etc.), information relating to the environment in which the image was captured (i.e., date, time, location, other environmental information, etc.), image headers, timestamps, checksums, watermarks, or other desired information.

Additional data included in images generated by conventional image sensors is typically accessible to any user that has access to the image. For example, any user with access to an image generated by a conventional image sensor will be able to access and alter the additional data that is included in the image, such as data identifying the image sensor that captured the image or a timestamp indicating when the image was captured. The digital image data in images generated by conventional image sensors can also be altered (i.e., the digital image data may be modified by a user with access to the image). In this way, images generated by conventional image sensors are susceptible to unauthorized tampering and other alterations that change the information included in the image. These alterations can be undetectable to another user who subsequently views the image. Such unauthorized tampering with the image and additional data included with the image can make it difficult for a desired end user of the image to determine the authenticity of the image and the additional data included with the image.

It would therefore be desirable to provide systems and methods for generating images including embedded information.

DETAILED DESCRIPTION

Electronic devices and systems such as digital cameras, computers, cellular telephones, and other electronic devices may include imaging systems that gather incoming light to capture an image. Electronic devices including imaging systems may also be integrated into other systems, such as into vehicles, security systems, and other systems that may monitor an environment. Imaging systems may include image sensors that include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Imaging systems may include control circuitry such as circuitry for operating the image pixels and readout circuitry for reading out image signals corresponding to the electric charge generated by the photosensitive elements.

Figure 1:
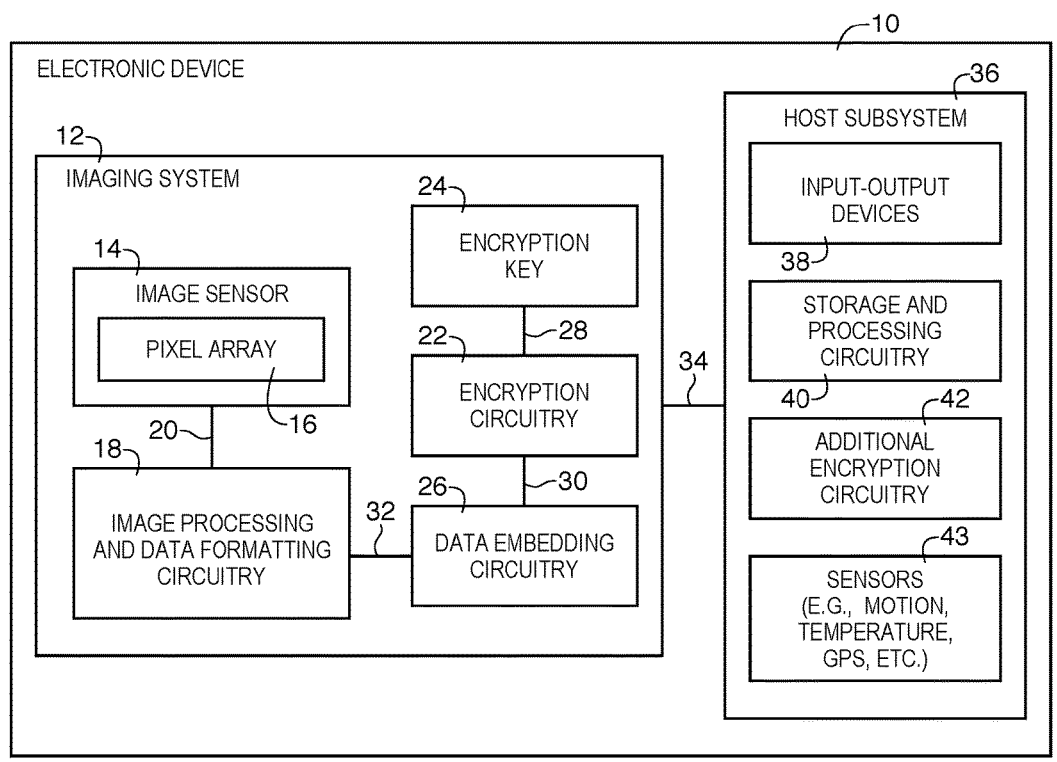
FIG. 1 is a diagram of an illustrative electronic device that may include an imaging system with encryption capabilities in accordance with an embodiment of the present invention.

FIG. 1 is a diagram of an illustrative electronic device that includes an imaging system. Electronic device 10 (sometimes referred to herein as an apparatus or device) of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Device 10 may include one or more imaging systems such as imaging system 12 (sometimes referred to herein as a system, imaging device, imaging equipment, imaging circuitry, image sensor integrated circuit, image sensor chip, or imaging chip). Imaging system 12 may be used to convert incoming light into digital image data. Imaging system 12 may include one or more corresponding image sensors 14 (sometimes referred to herein as an imager). During image capture operations, light from a scene may be focused onto image sensor 14. Image sensor 14 may include an array of pixels such as pixel array 16 (sometimes referred to herein as array 16).

Pixels in pixel array 16 may generate image signals in response to receiving light from a scene. For example, pixels in array 16 may include photosensitive elements such as photodiodes that convert incoming light into electric charge. Image pixels in pixel array 16 may be connected to pixel control and readout circuitry. Image pixels in pixel array 16 may be controlled using pixel control and readout circuitry. Pixel control and readout circuitry may include any desired pixel control and/or readout circuitry (e.g., row control circuitry, column read out circuitry, etc.). Pixel control and readout circuitry may include circuitry for converting analog image signals into corresponding digital image pixel data (e.g., a respective pixel value generated by each image sensor pixel). Pixel values generated by pixel array 16 and associated pixel control and readout circuitry may be provided to image processing and data formatting circuitry 18 (sometimes referred to herein as data formatting circuitry 18, formatting circuitry 18, image processing circuitry 18, or processing circuitry 18) via a communications path such as path 20. Image processing and data formatting circuitry 18 may include circuitry for processing digital or analog image signals (e.g., digital image pixel data). For example, image processing and data formatting circuitry 18 may perform color correction operations, filtering operations, sharpening operations, compression operations, or any other suitable operations on image pixel data generated by image sensor 14. If desired, pixel values and/or digital image data generated by image sensor 14 and processed by image processing and data formatting circuitry 18 may be transmitted via path 34 (or any other suitable communications path) to components of host subsystem 36 such as input/output devices 38 and storage and processing circuitry 40. In one example, host subsystem 36 may include sensors 43 and/or additional encryption circuitry 42 that may receive data from and/or transmit data to components of imaging device 12 over communications path 34 or any other suitable communications path.

Imaging system 12 may include encryption circuitry 22 (sometimes referred to herein as an encryption engine, encryption hardware, data encryption hardware, encryption system, or encrypter). Encryption circuitry 22 may perform encryption operations on desired data. Encryption circuitry 22 may perform encryption operations using a cryptographic key such as encryption key 24 (sometimes referred to herein as a key, private key, or private encryption key) to encrypt data provided to encryption circuitry 22. Encryption key 24 may, for example, be a private key of an asymmetric cryptographic key pair. Key 24 may, for example, only be available to a user of electronic device 10. Private key 24 may be used to encrypt data and a corresponding public key of the asymmetric key pair may be used to decrypt the data encrypted by the private key. This example is merely illustrative. In general, any desired cryptographic key may be used (e.g., a key of an asymmetric key pair, a key of a symmetric key pair, etc.).

If desired, encryption key 24 may be stored on electronic device 10 or imaging system 12 and/or may be provided as needed by a user (e.g., using an input device for receiving the private key as a user input from the user). For example, encryption key 24 may be stored on storage circuitry or in memory on system 13. In one suitable scenario, encryption key 24 may be stored on read-only memory (e.g., one-time programmable memory) that is included in electronic device 10. For example, encryption key 24 may be stored on read-only memory that is included in electronic device 10 as a component of imaging system 12. In such an arrangement, encryption circuitry 22 may access encryption key 24 through communications path 28. In another suitable scenario, encryption key 24 may be incorporated into memory that is included in encryption circuitry 22, image sensor 14, or image processing and data formatting circuitry 18. In one example, encryption key 24 may be stored on a component of electronic device 10 that is separate from imaging system 12. For example, encryption key 24 may be incorporated into host subsystem 36 as a component of additional encryption circuitry 42. In such an illustrative example, encryption circuitry 22 may access an encryption key 24 in additional encryption circuitry 42 through path 34. In yet another scenario, encryption key 24 may be stored external to electronic device 10. For example, encryption key 24 may be stored on a key server or other remote storage medium. In such an example, encryption circuitry 22 may access encryption key 24 through a wired or wireless connection, or any other suitable communications path. If desired, encryption circuitry 22 (or other suitable memory on which encryption key 24 is stored) may transmit encryption key 24 to other components of electronic device 10 or allow other components of electronic device 10 to otherwise access encryption key 24.

In an illustrative scenario sometimes described herein as an example, encryption key 24 may be incorporated into imaging system 12 on a single chip that includes the other components of imaging system 12. In such an example, encryption key 24 may be stored on read-only memory that is included in imaging system 12. Such read-only memory on which encryption key 24 is stored may be formed on a single image sensor chip that includes other components of imaging system 12 such as image sensor 14, image processing and data formatting circuitry 18, encryption circuitry 22, and data embedding circuitry 26. In one illustrative example, all of the components of imaging system 12 may be formed on a common chip (e.g., a single silicon image sensor chip) that includes encryption key 24. Storing encryption key 24 on read-only memory that is incorporated onto a common chip with other components of imaging system 12 may limit access to encryption key 24. For example, in order to access encryption key 24, the encryption key would either have to be known at the time that the encryption key was written to the read-only memory (or other component of imaging system 12, such as encryption circuitry 22), or the component of imaging system 12 into which encryption key 24 is incorporated would have to be accessed on the chip, and the encryption key would have to be decoded. If desired, encryption key 24 may not be readable by off-chip components (e.g., components in electronic device 10 that are not formed on a single chip with the components of imaging system 12, or external components separate from electronic device 10). Encryption circuitry 22 may be the only component of imaging system 12 with access to encryption key 24, and may generate and transmit encrypted data to other components of imaging system 12 and/or electronic device 10 without providing access to encryption key 24. This greatly limits the potential for encryption key 24 to be available outside of the component of imaging system 12 into which it is incorporated. In this manner, it may be difficult to generate data encrypted by encryption key 24 unless that data was encrypted by the stored copy of encryption key 24 that is incorporated into imaging system 12. This ensures that data encrypted using encryption key 24 originated from the imaging system 12 into which it is incorporated. This may be used to verify the source of data encrypted using encryption key 24.

Encryption circuitry 22 may receive any suitable data for encrypting. Encryption circuitry 22 may receive data from electronic device 10, imaging system 12, image sensor 14, pixel array 16, image processing and data formatting circuitry 18, or any other suitable component of electronic device 10. In one suitable example, encryption circuitry 22 may receive data that includes identifying information for imaging system 12 (e.g., a serial number, a manufacturer identification, an identification number or code, etc.). Encryption circuitry 22 may receive data that includes time information or any other desired information, such as data that indicates a time at which an image was captured by imaging system 12, a location at which an image was captured (e.g., using a global-positioning-system incorporated on device 10), environmental conditions that were present when an image was captured (e.g., device orientation, momentum, acceleration, temperature, ambient light, velocity, system time, etc.). This, however, is merely illustrative. Any data (sometimes referred to herein as image metadata or metadata) received at encryption circuitry 22 may provide information relating to any suitable property or characteristic of imaging system 12, image sensor 14, or any other component of electronic device 10, and /or images captured therewith.

In one illustrative example, data may be received at encryption circuitry 22 from sources external to imaging system 12. For example, host subsystem 36 may include one or more sensors 43 (e.g., motion sensors, temperatures sensors, global positioning system hardware, ambient light sensors, etc.) that may generate and provide data to imaging system 12 through signal path 34. Data provided by sensors 43 may be temporally associated with image data generated by imaging system 12 such that the image data generated by imaging system 12 and the data embedded in the image data (e.g., data from sensors 43) are generated at the same time. If desired, sensors 43 may be incorporated into imaging system 12 (e.g., temperature sensors may be included in image sensor 14) or may be provided as components that are external to electronic device 10.

Encryption circuitry 22 may use encryption key 24 to encrypt received data to generate encrypted data. In one illustrative example, encryption key 24 may be a private key stored at read-only memory on a common chip that includes the other components of imaging system 12. In such an example, encryption circuitry 22 may receive data and may access encryption key 24 to encrypt the received data. In this way, data received at encryption circuitry 22 (e.g., time information, location information, etc.) may be encrypted using encryption key 24, which may only be accessible to encryption circuitry 22 in imaging system 12.

Imaging system 12 may include data embedding circuitry 26 (sometimes referred to herein as embedding hardware, data embedding hardware, data embedder, embedder, or embedder circuitry). Data embedding circuitry 26 may receive digital image data from image processing and data formatting circuitry 18 through path 32 (or any other suitable communications path). Data embedding circuitry 26 may receive encrypted data (e.g., encrypted image metadata) from encryption circuitry 22 through path 30 (or any other suitable communications path). In one suitable example, data embedding circuitry may embed encrypted data received from encryption circuitry 22 into digital image data received from image processing and data formatting circuitry 18. For example, data embedding circuitry 26 may embed encrypted metadata into received image data such that the encrypted metadata and image data are a part of a single set of data (e.g., an image frame including both the encrypted metadata and the image data). In one illustrative example, data embedding circuitry 26 may render the encrypted data indistinguishable from the image data in which it is embedded. For example, data embedding circuitry 26 may embed encrypted data received from encryption circuitry 22 as a watermark in an image generated by imaging system 12, such that the data embedded in the image is not detectable to a user viewing the image.

In one illustrative scenario, data embedding circuitry 26 may embed encrypted data received from encryption circuitry 22 into an image header. In such an example, a user with access to the image may be able to detect that there is data embedded in the image header file (e.g., a user with access to the image may access the image header file to determine the presence of embedded data). In such an illustrative example, however, the embedded data has been encrypted by encryption circuitry 22. Therefore, even if a user can detect the information embedded in the image header, the user has no way of determining what information is contained in the data or altering the data unless the user has a corresponding key that allows the encrypted data to be decrypted (e.g., a public key corresponding to private key 24). It is also possible that a user with access to such an image may be able to determine what information is included in the image header (i.e., the user can access the data), but the user is still unable to alter the data without access to the decryption key. In this way, additional data may be embedded into a digital image in a manner that prevents the data from being modified or otherwise tampered with. This may ensure the integrity of the data embedded in the image.

In one illustrative example, a user may have access to the decryption key and may be able to extract and decrypt the embedded data. However, such a user does not have access to the encryption key 24 (because, for example, encryption key 24 is only accessible by encryption circuitry 22 in imaging system 12) and therefore cannot re-encrypt the data. In this way, the presence of encrypted data (e.g., data encrypted using encryption key 24 that can be decrypted using the corresponding public decryption key) in an image may serve as an implicit verification of the integrity of the encrypted data since the data could not have been altered and then re-encrypted.

In one example, imaging system 12 may capture video images (e.g., multiple image frames that are captured and combined into a video) in which encrypted image data may be embedded. In such an example, encrypted image data may be embedded into one or more of the frames of image data in the video and/or into multiple frames of a video image. For example, each frame in a video image segment may include the same encrypted data embedded therein, or different encrypted data may be embedded in different frames that make up a single video segment. In general, the data that is embedded in the frames of the video image data may be data related to an individual frame or frames of the video image (e.g., each frame may have data related to the frame itself embedded therein) or a segment of the video image data. If desired, video image data may be stored in a video file in which encrypted data may be embedded. For example, a video image file may include multiple frames of image data that are combined into a video and encrypted data that is embedded in the video image file in the form of an image header or timestamp (as examples). If desired, video images may be captured having data embedded in any combination of individual frames, segments, and files of the video image data.

Imaging system 12 may be in communication with host subsystem 36 through path 34. For example, imaging system 12 may transmit data from image processing and data formatting circuitry 18, encryption circuitry 22, data embedding circuitry 26, or other components of imaging system 12 to components of host subsystem 36 such as input/output devices 38 and storage and processing circuitry 40.

Storage and processing circuitry 40 may include one or more integrated circuits (e.g., image processing circuits, microprocessors, storage devices such as random-access memory and non-volatile memory, etc.) and may be implemented using components that are separate from imaging system 12 and/or that form part of imaging system 12 (e.g., circuits that form part of an integrated circuit that includes image sensor 14 or an integrated circuit within imaging system 12 that is associated with image sensors 14). Storage and processing circuitry 40 may include volatile and non-volatile memory (e.g., random-access memory, flash memory, hard drives, solid state drives, etc.). Storage and processing circuitry 40 may also include processors such as microprocessors, microcontrollers, digital signal processors, application specific integrated circuits, etc. Image data that has been captured by imaging system 12 may be processed and stored using storage and processing circuitry 40 (e.g., using an image processing engine on storage and processing circuitry 40, using an imaging mode selection engine on storage and processing circuitry 40, etc.). Processed image data may, if desired, be provided to external equipment (e.g., a computer, external display, or other device) using wired and/or wireless communications paths coupled to storage and processing circuitry 40. For example, image data processed by storage and processing circuitry 40 may be displayed to a user using input/output devices 38, or may be stored on electronic device 10 using storage circuitry included in host subsystem 36. Host subsystem 36 may include input/output devices 38 such as projectors, keypads, input-output ports, and displays. Input/output devices 38 may include a display that presents information to a user of an electronic device that includes electronic device 10. Images generated by imaging system 12 may be transmitted to components of host subsystem 36 for presentation to a user (using, for example, input/output devices 38) for storage (on storage and processing circuitry 40, for example).

The examples described above in which the components of imaging system 12 such as image sensor 14, pixel array 16, image processing and data formatting circuitry 18, encryption circuitry 22, encryption key 24, and data embedding circuitry 26 are all formed on a common image sensor chip are merely illustrative. In general, any components of imaging system 12 may be formed on any suitable number or configuration of imaging system chips in electronic device 10. For example, the components of imaging system 12 may be formed on multiple different chips. In such an illustrative example, the multiple different chips and components thereon may be connected by suitable wired or wireless communications paths.

Figure 2:
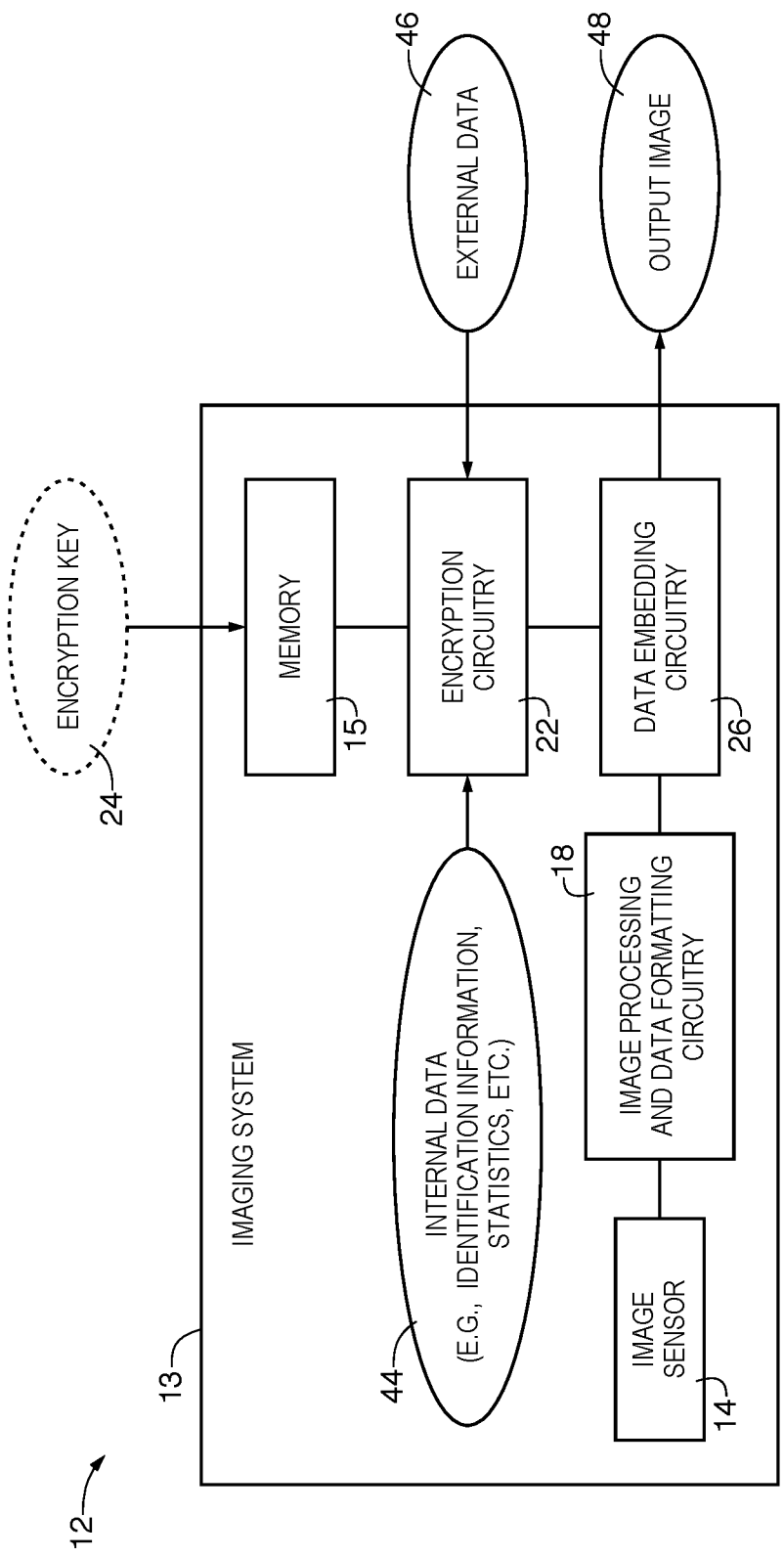
FIG. 2 is diagram of an illustrative imaging system including circuitry for encrypting and embedding data into an image in accordance with an embodiment of the present invention.

FIG. 2 is illustrative diagram of an imaging system such as imaging system 12 that may be included in electronic device 10. Imaging system 12 may be an imaging system including multiple components mounted on a single chip 13 (sometimes referred to herein as a common chip, an image sensor integrated circuit, an imager chip, or chip). In the illustrative example of FIG. 2, imaging system 12 includes an image sensor 14 (which may include a pixel array 16), image processing and data formatting circuitry 18, encryption circuitry 22, and data embedding circuitry 26. As described above in connection with FIG. 1, encryption circuitry 22 may receive data such as internal data 44 and/or external data 46. Internal data 44 and/or external data 46 may sometimes be referred to herein as image metadata or metadata, and may include information relating to images captured by electronic device 10 or the imaging system 12 used to capture such images. In one illustrative example, internal data 44 may include data that is stored in imaging system 12 (e.g., data that is stored on memory such as random-access memory or non-volatile memory). Such memory may be formed on the same chip 13 as the other components of imaging system 12. Internal data 44 may include information about imaging system 12 and the components included therein. For example, internal data 44 may include data that identifies the imaging system 12 using a serial number, manufacturer code, a unique identifier code, or another unique identifier. Such identifying information may identify the source of imaging system 12 or the components contained therein (e.g., internal data 44 may include information that is unique to imaging system 12). Internal data 44 may be encrypted and embedded into images generated by imaging system 12 to provide information relating to the source of the images or the environment in which the images were captured while guaranteeing that such information originated from imaging system 12 (i.e., the data has not been tampered with).

In one illustrative example, encryption circuitry 22 may receive data that is stored or generated external to imaging system 12, such as external data 46. In such an illustrative embodiment, encryption circuitry 22 may receive data from other components of electronic device 10 including host subsystem 36 and components such as input/output devices 38, sensors 43, and storage processing circuitry 40 contained therein. In one suitable scenario, encryption circuitry 22 may receive data from an external device that is separate from electronic device 10. For example, encryption circuitry 22 may receive external data from an additional electronic device that includes information relating to the environment in which imaging system 12 is located. External data 46 may include temperature data, location data, time data, date data, orientation data, speed and/or velocity data, acceleration data, or any other suitable data that may be provided to encryption circuitry 22 from a source external to imaging system 12. In one suitable example, external data 46 may include data generated from sensors that are either included in electronic device 10 or are external to electronic device 10. Such sensors may generate data such as ambient light data and proximity data. In one suitable example in which an imaging system 12 as described herein is incorporated into a vehicle, external data 46 may include information relating to the vehicle, such as vehicle safety information (e.g., airbag deployment information), maintenance information (e.g., a time, date, and location at which a maintenance service was performed), and/or vehicle travel information (e.g., velocity, location, and trip information). External data 46 may be encrypted and embedded into images generated by imaging system 12 to provide information relating to the source of the images or the environment in which the images were captured while guaranteeing that such information originated from imaging system 12 (i.e., the data has not been tampered with).

Encryption circuitry 22 may obtain an encryption key such as encryption key 24. As discussed above in connection with FIG. 1, encryption key 24 may be a private encryption key that is stored on memory such as memory 15 (sometimes referred to herein as a memory unit, storage, or a storage medium) in electronic device 10. Memory 15 may be read-only memory and may be located on a common chip 13 on which additional components of imaging system 12 are formed. Encryption key 24 may therefore only be accessible to components of imaging system 12 that have access to the read-only memory on which encryption key 24 is written (e.g., encryption circuitry 22) or at a location external to the imaging system at which the encryption key was recorded at the time that it was written. In this manner, imaging system 12 may uniquely encrypt data using a unique encryption key that is only accessible to imaging system 12. If desired, encryption key 24 may be incorporated into any suitable component of imaging system 12.

In one suitable example, encryption key 24 may be located in an off-chip location (e.g., encryption key 24 may be stored in memory that is not located in imaging system 12). In such an example, encryption key 24 may be written to memory that is a component of another portion of electronic device 12 (e.g., memory that is included in host subsystem 36, such as additional encryption circuitry 42), or may be stored entirely external to electronic device 10. In any case, encryption circuitry 22 may access encryption key 24 and use encryption key 24 to encrypt data such as internal data 44 and/or external data 46.

Internal data 44 and/or external data 46 that have been encrypted by encryption circuitry 22 using encryption key 24 may be inaccessible to a user unless the user has access to a key that allows the user to decrypt the encrypted data. In some illustrative embodiments, such a key may be a public key that is available to multiple users and allows anyone who has access to the public key to decrypt the data encrypted by encryption circuitry 22. In such an illustrative example, an asymmetric encryption algorithm may be used to generate the private key (i.e., encryption key 24) and to generate a public key (i.e., a decryption key) that may be used to decrypt the data encrypted by encryption circuitry 22. In such an illustrative example, any user with access to the decryption key may be able to decrypt the data encrypted by encryption circuitry 22, while only a user that has access to encryption key 24 may be able to encrypt data using encryption circuitry 22. In the illustrative example in which encryption key 24 is written to read-only memory that is incorporated into imaging system 12, the encryption key 24 is effectively only accessible to encryption circuitry 22. Therefore, data encrypted by encryption circuitry 22 using encryption key 24 may only be accessed by a user with access to the decryption key. This may ensure that the data encrypted by encryption circuitry 22 is not altered or tampered with prior to reaching a user with access to the decryption key and verify the source of the data encrypted using encryption key 24.

Image processing and data formatting circuitry 18 may receive image data (e.g., image pixel values) generated by pixels in a pixel array such as pixel array 16 in image sensor 14. Image processing and data formatting circuitry 18 may perform image processing operations on the image data (e.g., digital image data) such as color correction operations, sharpening operations, compression operations, filtering operations, or any other suitable processing operations that may be performed on image data generated by image sensor 14.

Data embedding circuitry 26 may receive data from image processing and data formatting circuitry 18 and encryption circuitry 22. For example, data embedding circuitry 26 may receive encrypted image metadata (e.g., internal data 44 or external data 46 that has been encrypted) from encryption circuitry 22 and/or may receive digital image data (e.g., image data generated by image sensor 14 and/or image data that has been processed by image processing and data formatting circuitry 18). In one suitable example, data embedding circuitry 26 may embed encrypted data received from encryption circuitry 22 in digital image data received from image processing and data formatting circuitry 18.

In one suitable scenario, data embedding circuitry 26 may embed encrypted data into digital image data such that the encrypted data is indecipherable from the digital image data.

For example, data embedding circuitry 26 may embed encrypted data into digital image data in the form of a watermark. In such an example, portions of image pixel data received by data embedding circuitry 26 may be replaced with encrypted data received from encryption circuitry 22. One or more bits of data, digital image data generated by individual pixels in pixel array 16, or digital image data generated by groups of pixels in pixel array 16 may be replaced by encrypted data generated by encryption circuitry 22. In such an example, the encrypted data may be embedded into the image data such that the data is undetectable even to a user with access to the image (e.g., the watermark is not visible to the user). If desired, the visibility of a watermark associated with digital image data may vary based on the method used to embed the encrypted data in the image. For example, the encrypted data may be embedded in a watermark that is readily visible to a user or that is difficult to see but still detectable. In general, data may be embedded in an image watermark having any desired visibility.

In one illustrative example, data embedding circuitry 26 may embed encrypted data into an image header included in the digital image data received from image processing and data formatting circuitry 18. In such an example, the encrypted data (e.g., encrypted metadata) embedded in the image header may be detectable by a user with access to the digital image data. However, because the data is encrypted, only a user with access to the public key (e.g., the decryption key) will be able to decrypt and access the embedded data.

In one illustrative example, data embedding circuitry 26 may embed encrypted checksum data into digital image data received from image processing and data formatting circuitry 18. In such an example, the checksum may be encrypted by encryption circuitry 22 and subsequently embedded into digital image data by data embedding circuitry 26. A user with access to a digital image that includes the encrypted checksum may check the encrypted checksum data against data associated with the digital image. For example, file size and/or file data information associated with the digital image data having the encrypted checksum embedded therein may be checked against reference image data (e.g., file size and/or file data).

For example, checksum data may be calculated for an image that does not have encrypted data embedded therein. If desired, the checksum data may be calculated based on information relating to the image (e.g., file size, file data, etc.). The checksum data may then be encrypted and embedded in the image. Upon receipt of the image including the encrypted checksum, a user may extract and decrypt the embedded checksum data. The decrypted checksum data (e.g., file size data) may then be compared to data related to the image after extraction of the embedded checksum, such as file size data of the image without the embedded checksum (i.e., file size data that should match the original file size data encrypted in the checksum). The decrypted checksum data may then be compared to the file size data (or other suitable data) of the image after extraction of the checksum data to verify that the image was not modified between the time at which the data was embedded and the time at which the data was extracted. In one suitable example, such checksum data may be used to verify that the image data was not modified even when other encrypted data (e.g., encrypted image header data or other additional data that may not be modified when the image data is altered) can be verified.

The example given above, however, is merely illustrative. Generally, any suitable checksum data may be encrypted and embedded in an image. If desired, a user with access to the decryption key may decrypt the checksum embedded in the digital image data. The checksum may then be analyzed in any suitable manner to determine the integrity of the data. Once the checksum has been decrypted, a user may be able to determine the digital image data has been modified (e.g., if the checksum does not match a reference value, a user may be able to determine that the digital image data has been tampered with).

In one illustrative scenario, data embedding circuitry 26 may embed an encrypted timestamp into digital image data received from image processing and data formatting circuitry 18. Because the timestamp is encrypted, a user with access to the digital image data can verify that the timestamp has not been altered or otherwise tampered with. This may ensure the integrity of the timestamp.

The examples described above in are merely illustrative. In general, data embedding circuitry may embed any suitable encrypted data or unencrypted data into image data received from image sensor 14 or image processing and formatting circuitry 18. Data embedding circuitry 26 may output an output image 48 (sometimes referred to herein as an image, final image, encrypted image, final image frame, embedded image, or output) that includes the digital image data and the encrypted data embedded therein. As described in the illustrative scenarios above, data embedded in the output image 48 may or may not be detectable to a user having access to the output image 48. In any case, output image 48 may include encrypted data that can only be accessed or modified using a corresponding decryption key. In this manner, an output image 48 may be provided with additional data (e.g., image metadata) that is resistant to tampering and that may have its integrity verified by the user accessing the image.

Figure 3:
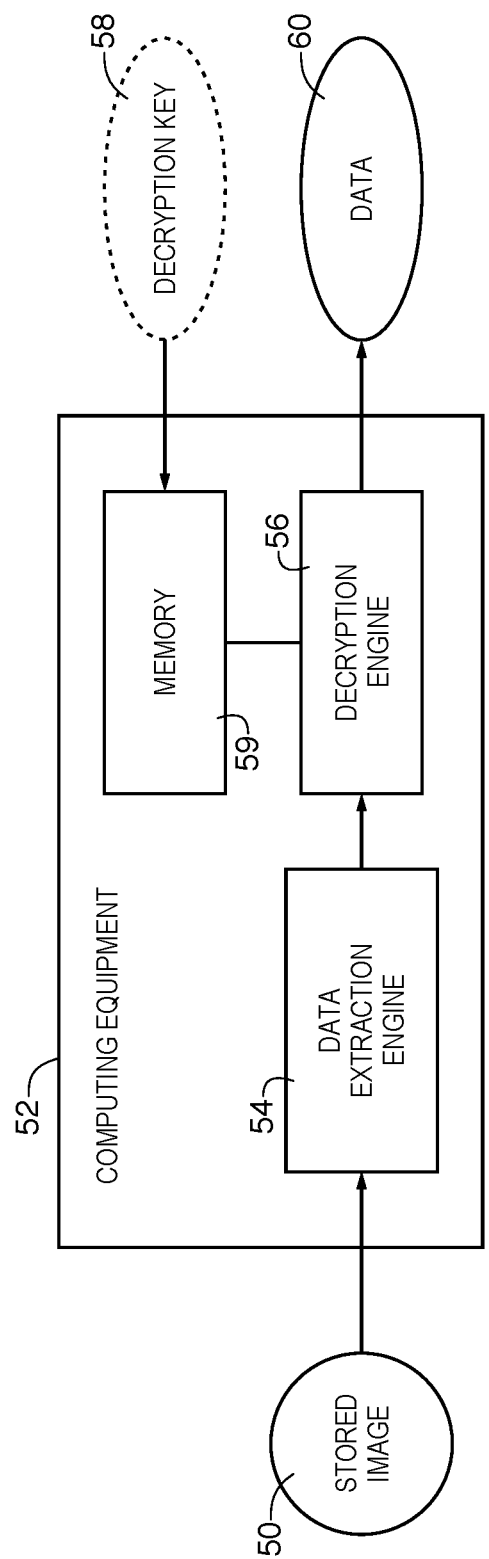
FIG. 3 is a diagram of illustrative computing equipment for extracting and decrypting encrypted data that is embedded in an image in accordance with an embodiment of the present invention.

A diagram of illustrative computing equipment that may extract and decrypt encrypted data embedded in an image is shown in in FIG. 3. In the illustrative example of FIG. 3, an image such as stored image 50 (sometimes referred to herein as an output image, image, embedded image, or encrypted image) may be provided. In one illustrative example, stored image 50 may be an image in which encrypted data has been embedded into the digital image data, such as output image 48 of FIG. 2. In one illustrative example, stored image 50 may be stored on electronic device 10. For example, stored image 50 may be an image captured by imaging system 12 in which encrypted data has been embedded (e.g., using encryption circuitry 22 and embedding circuitry 26). Stored image 50 may be stored on electronic device 10 (e.g., stored image 50 may be stored in storage and processing circuitry 40 in host subsystem 36, or in any other suitable storage medium on electronic device 10). This, however, is merely illustrative. Stored image 50 may be stored on memory that is not included in electronic device 10 (i.e., memory that is separate from or external to electronic device 10). In one illustrative example, computing equipment 52 (sometimes referred to herein as a computer, processor, processing system, computing system, or hardware) may include memory suitable to store data such as stored image 50.

As shown in the illustrative example of FIG. 3, computing equipment 52 may receive stored image 50. Computing equipment 52 may receive stored image 50 from electronic device 10, from a source external to electronic device 10 and to computing equipment 52, and/or from memory that is included in computing equipment 52.

Computing equipment 52 may include a data extraction engine 54 (sometimes referred to herein as data extractor, extractor, extraction engine, or data extraction circuitry). Data extraction engine 54 may include a computer-programmable medium that is configured to extract data such as data that is embedded in stored image 50. In one illustrative embodiment, extraction engine 54 may include software stored thereon. Extraction engine 54 may include any suitable memory (e.g., read-only memory, non-volatile memory, random access memory, removable memory, etc.) and/or processing equipment that may be programmed to extract data that is embedded in stored image 50. Extraction engine 54 may include a computer program or other computer-executable code, which may be stored on any suitable memory accessible by computing equipment 52 to execute the computer program or computer-executable code.

Data extraction engine 54 may extract data that is embedded in stored image 50. In one illustrative example, data extraction engine 54 may extract data that has been embedded in stored image 50 by data embedding circuitry 26 (e.g., encrypted metadata). In such an illustrative example, data extraction engine 54 may extract encrypted data from stored image 50. That is, extraction engine 54 may generate extracted data (sometimes referred to herein as encrypted data, extracted metadata, or encrypted metadata) from stored image 50.

For example, data extraction engine 54 may extract encrypted metadata that was embedded in stored image 50 as a watermark. In such an example, data extraction engine 54 may reveal the presence of data embedded in stored image 50 that would not otherwise have been detectable by a user with access to the image. The data extracted by data extraction engine 54 may be encrypted data (e.g., data extraction engine 54 may extract encrypted data and present the encrypted data to a user). However, a user presented with encrypted data may not be able to access or modify the encrypted data without a suitable key or other means for decrypting the data.

In one suitable scenario, data extraction engine 54 may extract data that has been embedded in stored image 50 in the form of an image header (i.e., data extraction engine 54 may generate extracted data). Such extracted data (i.e., image header data) may include encrypted image metadata. Data extraction engine 54 may present the extracted data included in the image header to the user, but the user may not be able to access or modify the encrypted data.

In one illustrative example, data extraction engine 54 may extract encrypted checksum data that has been embedded in stored image 50 (i.e., data extraction engine 54 may generate extracted data in the form of extracted checksum data). In such an illustrative scenario, data extraction engine 54 may extract the encrypted checksum data from stored image 50 and present the encrypted checksum data to a user. However, the user may be unable to access the encrypted checksum data unless the user has access to an appropriate key with which to decrypt the encrypted checksum data, such as decryption key 58 (sometimes referred to herein as a key or public key).

In one illustrative scenario, data extraction engine 54 may extract an encrypted timestamp embedded in stored image 50. Such extracted data (i.e., encrypted timestamp data) that has been extracted from stored image 50 may not be accessible to a user unless the user is provided with a suitable key for decrypting the encrypted timestamp, such as decryption key 58.

Computing equipment 52 may include a decryption engine 56 (sometimes referred to herein as a decrypter, decryption circuitry, data decrypter, data decryption engine, or data decryption circuitry). Decryption engine 56 may include a computer-programmable medium that is configured to decrypt data such as extracted data that has been extracted from stored image 50 by data extraction engine 54. In one illustrative embodiment, decryption engine 56 may include software stored on computing equipment 52. Decryption engine 56 may include any suitable memory (e.g., read-only memory, non-volatile memory, random access memory, removable memory, etc.) and/or processing circuitry that may be programmed to decrypt encrypted data that is extracted from stored image 50. Decryption engine 56 may include a computer program or other computer-executable code, which may be stored on any suitable memory accessible by computing equipment 52 to execute the computer program or computer-executable code to decrypt encrypted data that has been extracted from stored image 50.

Decryption engine 56 may be provided with a key such as decryption key 58. In one suitable scenario that is sometimes described herein as an example, decryption key 58 may be a public key generated using an asymmetric encryption algorithm. Decryption key 58 may be configured to decrypt data that has been encrypted by encryption circuitry 22 using encryption key 24. For example, encryption key 24 and decryption key 58 may both be generated by the same asymmetric encryption algorithm. Only one copy of encryption key 24 may be available (i.e., encryption key 24 may be stored on-chip in imaging system 12 of electronic device 10), whereas multiple copies of public key 58 may be available. In this manner, data extracted by data extraction engine 54 may only be decrypted by decryption engine 56 if decryption engine 56 has access to public key 58.

In one illustrative example, computing equipment 52 may include memory 59 on which decryption key 58 is stored (e.g., non-volatile memory, read-only memory, random access memory, one time non-programmable memory, etc.) In some suitable scenarios, decryption key 58 may be stored external to computing equipment 52, such as on an external server (e.g., a key sever) or other suitable storage medium. In one illustrative example, computing equipment 52 may be provided with access to decryption key 58 over a wired or wireless connection to the storage medium on which decryption key 58 is stored.

Decryption engine 56 may use decryption key 58 to decrypt data extracted from stored image 50 by data extraction engine 54 to generate decrypted data such as data 60 (sometimes referred to herein as decrypted data or output data). Data 60 may include data such as internal data 44 and/or external data 46 (e.g., image metadata). In such an example, decryption engine 56 may decrypt the extracted data such that the decrypted data is accessible to the user. This may allow a user to determine the information that is included in data 60 and/or to alter such data. In one illustrative example, data 60 may include data that was embedded in stored image 50 in the form of a watermark. Upon decrypting the data extracted from the watermark in stored image 50, a user may access the data included in the watermark. In the illustrative example in which data extraction engine 54 generated extracted image header data, decryption engine 56 may decrypt encrypted image header data such that a user can access the data stored in the image header. In the illustrative example in which the data extracted from stored image 50 includes encrypted checksum data, data 60 generated by decryption engine 56 may include decrypted checksum data. A user may then reference the decrypted checksum data against a known value to determine whether or not the data included in the checksum has been altered. This may allow a user to determine the integrity of the data that was encrypted and embedded into stored image 50. In the illustrative example in which stored image 50 includes encrypted timestamp data, data 60 generated by decryption circuitry 56 may provide decrypted timestamp data to a user. A user may then be able to determine timestamp information related to the image that the user can verify has not been tampered with.

In each of the illustrative examples described above, the encrypted data embedded in stored image 50 may only be accessible using encryption key 24 (which may be stored on-chip in imaging system 12) or decryption key 58. In this way, a user with access to data 60 is assured that the data 60 has maintained its integrity between the time at which it was encrypted by encryption circuitry 22 and embedded in an image and the time at which it was decrypted using decryption engine 56. In a scenario in which access to the public decryption key 58 is limited, the integrity of the data included in output image 48 and/or stored image 50 may be verified.

For example, a user accessing data 60 may know that data included in an image header extracted from stored image 50 has not been altered or otherwise tampered with. A user accessing data 60 that was extracted from a watermark in stored image 50 may be able to verify that the watermark embedded in stored image 50 is the watermark is original and has not been modified, as only individuals with decryption key 58 are able to access the data. In one suitable scenario in which the data 60 extracted from stored image 50 is an image checksum, a user may be able to verify that stored image 50 has not been altered or otherwise tampered with by referencing the checksum data against a known reference value. If the image has been altered, the checksum data will not match the reference value, and the user can determine that the image has been altered between the time at which it was embedded with encrypted data in imaging system 12 and the time at which the data 60 was decrypted. If the checksum data matches the reference value, then the user can determine that the image from which the checksum data was extracted (e.g., stored image 50) was not altered, as an alteration to the image may alter the checksum data (i.e., even if the image were tampered with, a user making such a modification would not be able to modify the encrypted checksum such that it would match the reference value after the alteration, as the user does not have access to encryption key 24 to re-encrypt the modified data). In this way, the encrypted checksum data may serve as an indicator of whether an image has been altered or not. In the illustrative example in which encrypted timestamp data is embedded in stored image 50, decrypted data 60 may represent timestamp data that the user can be assured is accurate (i.e., has not been altered, as access to decryption key 58 is needed to alter the timestamp data).

Figure 4:
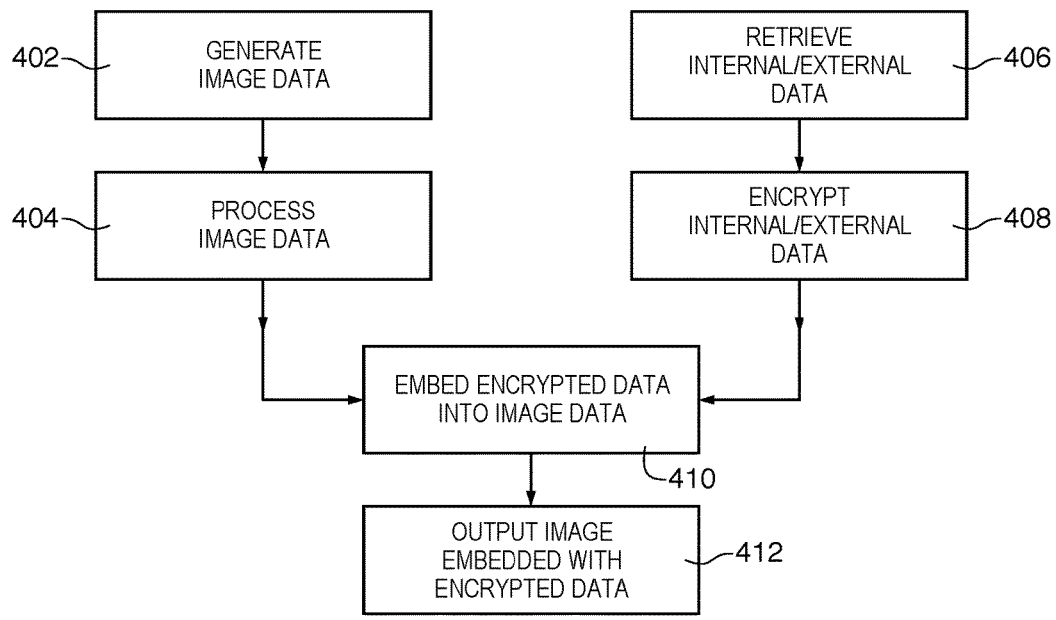
FIG. 4 is a flow chart of illustrative steps that may be performed by an imaging system of the type shown in FIG. 2 to generate an image in which encrypted data may be embedded in accordance with an embodiment of the present invention.

A flow chart of illustrative steps that may be performed in generating an image in which encrypted data may be embedded is shown in FIG. 4.

At step 402, image data may be generated by an imaging system such as image sensor 14 in electronic device 10. In one illustrative example, the image data may include digital image data, such as digital image pixel values generated by image pixels in pixel array 16.

At step 404, image data (e.g., image data generated in step 402) may be processed, for example, by image processing and data formatting circuitry 18. Processing the image data may include performing color correction operations, filtering operations, sharpening operations, compression operations, or any other suitable operations that may be performed on digital image pixel data.

At step 406, data such as internal data 44 and/or external data 46 (e.g., image metadata) may be accessed by electronic device 10 (e.g., by encryption circuitry 22). Image metadata may include information relating to electronic device 10 and/or imaging system 12 and may be retrieved from memory that is included in electronic device 10. In one illustrative example, the metadata may include information relating to an environment in which electronic device 10 is operated and may be retrieved from memory or other systems and/or electronic devices that are external (but may be in communication with) electronic device 10.

At step 408, data such as internal data 44 and/or external data 46 may be encrypted by encryption circuitry 22 to generate encrypted data. Encryption circuitry 22 may use a private cryptographic key such as encryption key 24 to encrypt the data. Encryption key 24 may be included on a single chip 13 that also includes other components of imaging system 12 such as encryption circuitry 22 and image sensor 14.

At step 410, the encrypted data generated by encryption circuitry 22 in step 408 may be embedded into the digital image data generated by image sensor 14 in step 402 and/or image processing and data formatting circuitry 18 in step 404. The encrypted data may be embedded in the digital image data in the form of an encrypted image header, an encrypted watermark, an encrypted timestamp, an encrypted checksum, or any other suitable form of embedded data.

At step 412, an image including encrypted data embedded in the digital image data may be output by imaging system 12. The output image (e.g., output image 48) may be output to another component of electronic device 10 (e.g., a component of host subsystem 36 such as storage and processing circuitry 40 or input/output devices 38). In one illustrative example, output image 48 may be output to an electronic device or memory that is external to electronic device 10.

Figure 5:
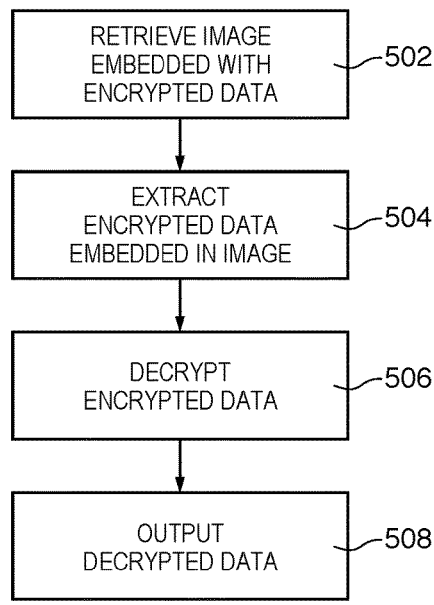
FIG. 5 is a flow chart of illustrative steps that may be performed by computing equipment of the type shown in FIG. 3 to extract and decrypt encrypted data that is embedded in an image in accordance with an embodiment of the present invention.

A flow chart of illustrative steps that may be performed to extract and decrypt encrypted data that is embedded in an image is shown in FIG. 5.

At step 502, an image (e.g., stored image 50) may be retrieved by computing equipment 52. Stored image 50 may be an output image 48 generated by imaging system 12 that includes encrypted image metadata embedded therein. Depending on the method by which the data was embedded, the embedded data may not be detectable even to a user with access to stored image 50. Stored image 50 may be retrieved from any suitable location, including from memory included in computing equipment 52 or from a source external to computing equipment 52 (e.g., from electronic device 10 or from other suitable external memory).

At step 504, data embedded in the image (e.g., stored image 50) accessed in step 502 may be extracted. For example, data extraction engine 54 (e.g., computer-executable code stored on memory that is accessible to computing equipment 52) may extract encrypted data that is embedded in stored image 50.

At step 506, encrypted data extracted in step 504 may be decrypted. In one illustrative example, the encrypted data extracted in step 504 is decrypted by decryption engine 56 (e.g., computer-executable code stored on memory that is accessible to computing equipment 52) to generate decrypted data. Decryption engine 56 may use a public cryptographic key such as decryption key 58 to decrypt the data encrypted using encryption key 24 in imaging system 12.

At step 508, decrypted data such as data 60 may be output by computing equipment 52. Data 60 may include decrypted data that may be accessed by a user. For example, data 60 may include timestamp data, image checksum data, an image watermark, or other suitable data that was encrypted and embedded in an image. Because the encrypted data can only be accessed using decryption key 58, a user may use data 60 to ensure that an image in which data was embedded was not tampered with or altered.

Figure 6:
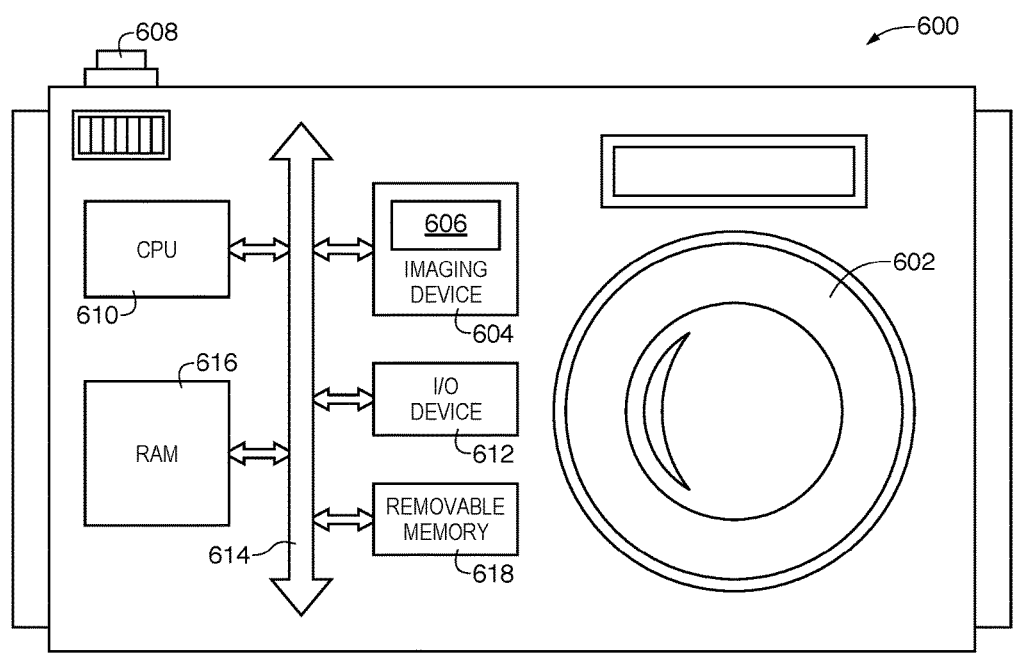
FIG. 6 is a block diagram of a processor system that may employ the embodiments of FIGS. 1-5 in accordance with an embodiment of the present invention.

FIG. 6 shows in simplified form a typical processor system 600, such as a digital camera, which includes an imaging device such as imaging device 604 (e.g., an imaging system 12 that may include an image sensor 14 and image processing and data formatting circuitry 18). Imaging device 604 may further include a pixel array 606, which may include a pixel array 16. Processor system 600 is exemplary of a system having digital circuits that could include imaging device 604 (which may include, for example, imaging system 12). Without being limiting, such a system could include a computer system, still or video camera system, scanner, machine vision, vehicle navigation, video phone, surveillance system, auto focus system, star tracker system, motion detection system, image stabilization system, and other systems employing an imaging device.

Processor system 600, which may be a digital still or video camera system, may include a lens such as lens 602 for focusing an image onto a pixel array such as pixel array 606 (which may include a pixel array 16) when shutter release button 608 is pressed. Processor system 600 may include a central processing unit such as central processing unit (CPU) 610. CPU 610 may be a microprocessor that controls camera functions and one or more image flow functions and communicates with one or more input/output (I/O) devices 612 (such as, for example, input/output devices 38) over a bus such as bus 614. Imaging device 604 may also communicate with CPU 610 over bus 614. Processor system 600 may include random access memory (RAM) 616 and removable memory 618. Removable memory 618 may include flash memory that communicates with CPU 610 over bus 614. Imaging device 604 may be combined with CPU 610, with or without memory storage, on a single integrated circuit or on a different chip. Although bus 614 is illustrated as a single bus, it may be one or more buses or bridges or other communication paths used to interconnect the system components.

An imaging system for encrypting and embedding data into images may include an array of image pixels that generate image data in response to image light, encryption circuitry that receives additional data that is different than the image data and that generates encrypted data by encrypting the additional data using a cryptographic key, and data embedding circuitry that is configured to embed the encrypted data into the image data to generate an output image. The imaging system may include image processing circuitry that processes the image data generated by the array of image pixels. The data embedding circuitry may embed the encrypted data into the processed image data.

If desired, the array of image pixels, the encryption circuitry, and the data embedding circuitry may be formed on a common integrated circuit. Memory may be formed on the common integrated circuit, and the cryptographic key may be stored on the memory. The memory may be one-time programmable memory. The encryption circuitry may retrieve the encryption key from the memory over a communications path formed on the common integrated circuit.

If desired, the data embedding circuitry may embed the encrypted data in an image header associated with the output image.

If desired, the data embedding circuitry may embed the encrypted data in an image watermark in the output image. The data embedding circuitry may replace at least some of the image data generated by the array of image pixels with the encrypted data in the output image having the watermark.

If desired, the data embedding circuitry may embed the encrypted data in an image checksum in the output image.

If desired, the data embedding circuitry may embed the encrypted data in an image timestamp in the output image.

A method of generating images that include encrypted data may include capturing image data in response to light received at an imager on an image sensor integrated circuit, receiving image metadata with an encryption engine on the image sensor integrated circuit, obtaining an encryption key stored on the image sensor integrated circuit with the encryption engine, and encrypting the image metadata using the encryption engine and the encryption key to generate encrypted metadata with the encryption engine.

If desired, the method may include embedding the encrypted metadata into the image data using a data embedder on the image sensor integrated circuit and outputting a final image from the data embedder that includes the image data and the encrypted metadata embedded therein.

If desired, receiving the image metadata may include obtaining data stored in a memory unit on the image sensor integrated circuit. The image metadata may include information identifying the image sensor integrated circuit as a source of the image data.

If desired, receiving the image metadata may include obtaining data stored external to the image sensor integrated circuit through a communications path. The image metadata may include information indicative of an environment in which the image data was captured.

A system may include a central processing unit, memory, input-output circuitry, and an imaging device. The imaging device may include an image sensor chip, an array of image sensor pixels formed on the image sensor chip, image formatting circuitry formed on the image sensor chip, data encryption hardware formed on the image sensor chip, memory formed on the image sensor chip, and data embedding hardware formed on the image sensor chip. An encryption key may be stored on the memory.

If desired, the array of image sensor pixels may generate image pixel data in response to received light, and the image formatting circuitry may process the image pixel data to generate formatted image data. The data encryption hardware may receive data associated with the digital image pixel data. The data encryption hardware may encrypt the data using the encryption key to generate encrypted data. The data embedding hardware may embed the encrypted data into the formatted image data to generate an image.

The foregoing is merely illustrative of the principles of this invention and various modifications can be made by those skilled in the art without departing from the scope and spirit of the invention. The foregoing embodiments may be implemented individually or in any combination.

What is claimed is:

1. An imaging system comprising:
a silicon image sensor chip;
an array of image pixels on the silicon image sensor chip that generates image data in response to incident light;
a sensor on the silicon image sensor chip that generates additional data while the array of image pixels generates the image data, wherein the additional data is different than the image data;
encryption circuitry on the silicon image sensor chip that encrypts the additional data to generate encrypted data; and
data embedding circuitry on the silicon image sensor chip that embeds the encrypted data into the image data.

2. The imaging system defined in claim 1, further comprising:
image processing circuitry that processes the image data generated by the array of image pixels, wherein the data embedding circuitry embeds the encrypted data into the processed image data.

3. The imaging system defined in claim 1, wherein the encryption circuitry encrypts the additional data using a cryptographic key, the imaging system further comprising:
memory on the silicon image sensor chip, wherein the cryptographic key is stored in the memory.

4. The imaging system defined in claim 3, wherein the memory comprises one-time programmable memory.

5. The imaging system defined in claim 3, wherein the encryption circuitry retrieves the cryptographic key from the memory over a communications path on the silicon image sensor chip.

6. The imaging system defined in claim 1, wherein the data embedding circuitry generates an output image from the encrypted data and the image data.

7. The imaging system defined in claim 6, wherein the data embedding circuitry embeds the encrypted data in an image header associated with the output image.

8. The imaging system defined in claim 6, wherein the data embedding circuitry embeds the encrypted data in an image checksum in the output image.

9. The imaging system defined in claim 6, wherein the data embedding circuitry embeds the encrypted data in a timestamp in the output image.

10. The imaging system defined in claim 6, wherein the data embedding circuitry embeds the encrypted data in an image watermark in the output image.

11. The imaging system defined in claim 10, wherein the data embedding circuitry replaces at least some of the image data generated by the array of image pixels with the encrypted data in the output image.

12. The imaging system defined in claim 1, wherein the sensor comprises a sensor selected from the group consisting of: a motion sensor, a temperature sensor, and an ambient light sensor.

13. A method comprising:
with an imager on a silicon image sensor chip, capturing image data;
with a sensor on the silicon image sensor chip, generating additional data at the same time that the imager is capturing the image data;
with an encryption engine on the silicon image sensor chip, encrypting the additional data to generate encrypted additional data; and
with a data embedder on the silicon image sensor chip, embedding the encrypted additional data into the image data to generate an output image that includes the image data and the encrypted additional data.

14. The method defined in claim 13, wherein the sensor is a motion sensor, and wherein generating the additional data comprises generating velocity data.

15. The method defined in claim 13, further comprising:
with the encryption engine, receiving information about the imager that is stored in a memory unit on the silicon image sensor chip, wherein the information about the imager comprises information identifying the silicon image sensor chip as a source of the image data;
with the encryption engine, encrypting the information to generate encrypted information; and
with the data embedder, embedding the encrypted information into the image data.

16. The method defined in claim 13, further comprising:
with the encryption engine, receiving information stored external to the silicon image sensor chip;

with the encryption engine, encrypting the information to generate encrypted information; and with the data embedder, embedding the encrypted information into the image data.

17. The method defined in claim 16, wherein the information stored external to the silicon image sensor chip comprises information indicative of an environment in which the image data was captured.

18. An imaging device comprising:

a single common silicon image sensor chip;

pixels formed on the single common silicon image sensor chip, wherein the pixels generate image data in response to incident light;

a sensor formed on the single common silicon image sensor chip, wherein the sensor generates sensor data while the pixels generate the image data;

data encryption hardware formed on the single common silicon image sensor chip, wherein the data encryption hardware encrypts the sensor data to generate encrypted sensor data; and data embedding hardware formed on the single common silicon image sensor chip, wherein the data embedding hardware embeds the encrypted sensor data into the image data to generate an image.

19. The imaging device defined in claim 18, further comprising:

image formatting circuitry formed on the single common silicon image sensor chip, wherein the image formatting circuitry processes the image data to generate formatted image data, and wherein the data embedding hardware embeds the encrypted sensor data into the formatted image data to generate the image.

20. The imaging device defined in claim 18, wherein the sensor comprises a motion sensor, and wherein the sensor data includes velocity data generated by the motion sensor.

* * * * *